(12) United States Patent
Lansell et al.

(10) Patent No.: US 10,550,731 B2
(45) Date of Patent: Feb. 4, 2020

(54) SYSTEMS AND METHODS FOR GENERATING STEAM BY CREATING SHOCKWAVES IN A SUPERSONIC GASEOUS VORTEX

(71) Applicant: LLT International (Ireland) Ltd., Dublin OT (IE)

(72) Inventors: Peter Lansell, Kew (AU); David Lowe, Alphington (AU)

(73) Assignee: LLT International (Ireland) Ltd., Dublin (IE)

( * ) Notice: Subject to any disclaimer, the term of this patent is extended or adjusted under 35 U.S.C. 154(b) by 414 days.

(21) Appl. No.: 15/406,608

(22) Filed: Jan. 13, 2017

(65) Prior Publication Data
US 2018/0202323 A1    Jul. 19, 2018

(51) Int. Cl.
*F01K 25/06* (2006.01)
*F01K 3/20* (2006.01)
(Continued)

(52) U.S. Cl.
CPC ............... *F01K 25/06* (2013.01); *F01K 3/20* (2013.01); *F01K 11/02* (2013.01); *B01J 3/08* (2013.01);
(Continued)

(58) Field of Classification Search
CPC ....... B01J 8/16; B01J 8/14; B01J 8/002; B01J 3/08; B01J 19/26; B01J 19/10;
(Continued)

(56) References Cited

U.S. PATENT DOCUMENTS

| 2,257,907 A | 10/1941 | Griswold |
| 2,532,554 A | 12/1950 | Joeck |

(Continued)

FOREIGN PATENT DOCUMENTS

| EA | 000004 | 9/1997 |
| FR | 1048667 | 12/1953 |

(Continued)

OTHER PUBLICATIONS

Demare, D., et al., "Acoustic enhancement of combustion in lifted non-remixed jet flames", The Combusion Institute, 139 (2004), 312-328, Elsevier, Inc.
(Continued)

*Primary Examiner* — Craig Kim
(74) *Attorney, Agent, or Firm* — Pillsbury Winthrop Shaw Pittman, LLP

(57) ABSTRACT

Steam may be generated using an apparatus that creates shockwaves in a supersonic gaseous vortex. The apparatus includes a chamber configured to receive, pressurize, and heat fuel gas and/or oxygen containing gas. One or more inlets positioned at a first end of the chamber and arranged to emit fuel gas, oxygen containing gas, or water as one or more jet streams tangentially to an internal surface of the chamber may create a gaseous vortex rotating about a longitudinal axis within the chamber. The inlet(s) may include one or more inlet nozzles structured to accelerate the one or more fuel gas, oxygen-containing gas, or water to a supersonic velocity and adjustably control frequency of shockwaves emitted into the gaseous vortex. Water can be injected into the chamber to stabilize internal chamber temperature where it may be converted into steam. An outlet may be configured to emit product gases and/or steam from the chamber.

18 Claims, 8 Drawing Sheets

(51) Int. Cl.
*F01K 11/02* (2006.01)
*B02C 19/18* (2006.01)
*B01J 3/08* (2006.01)
*B01J 8/16* (2006.01)
*B01J 19/10* (2006.01)

(52) U.S. Cl.
CPC .................. *B01J 8/16* (2013.01); *B01J 19/10* (2013.01); *B02C 19/18* (2013.01)

(58) Field of Classification Search
CPC ........................ B01J 19/186; B01J 19/06; B01J 2219/00761; B01J 2208/00212; B01J 2208/00415; B01J 2208/00433; B01J 2208/00442; B01J 2208/00469; B01J 2208/00504; B01J 2208/00902; B02C 19/18; B02C 19/186; B02C 19/06; F01K 25/06; F01K 11/02; F01K 3/20
See application file for complete search history.

(56) References Cited

U.S. PATENT DOCUMENTS

| | | | |
|---|---|---|---|
| 2,752,097 | A | 6/1956 | Lecher |
| 3,178,121 | A | 4/1965 | Wallace, Jr. |
| 3,254,848 | A | 6/1966 | Stephanoff |
| 3,257,080 | A | 6/1966 | Snyder |
| 3,301,292 | A | 1/1967 | O'Connor |
| 2,997,245 | A | 8/1967 | Nilsson et al. |
| 3,462,086 | A | 8/1969 | Bertrand et al. |
| 3,565,348 | A | 2/1971 | Dickerson et al. |
| 3,602,439 | A | 8/1971 | Nakayama |
| 4,198,004 | A | 4/1980 | Albus et al. |
| 4,248,387 | A | 2/1981 | Andrews |
| 4,354,641 | A | 10/1982 | Smith |
| 4,515,093 | A | 5/1985 | Beardmore et al. |
| 4,671,192 | A | 6/1987 | Hoffert et al. |
| 4,921,173 | A | 5/1990 | Bartley |
| 5,219,530 | A | 6/1993 | Hertzberg et al. |
| 5,246,575 | A | 9/1993 | Alexander |
| 5,277,369 | A | 1/1994 | Moriya et al. |
| 5,855,326 | A | 1/1999 | Beliavsky |
| 6,145,765 | A | 11/2000 | Capelle, Jr. et al. |
| 6,158,676 | A | 12/2000 | Hughes |
| 6,824,086 | B1 | 11/2004 | Mazurkiewicz et al. |
| 7,137,580 | B2 | 11/2006 | Graham et al. |
| 7,398,934 | B1 | 7/2008 | Capelle, Jr. |
| 7,621,473 | B2 | 11/2009 | Capelle, Jr. |
| 7,789,331 | B2 | 9/2010 | Zehavi et al. |
| 7,850,105 | B2 | 12/2010 | Ito et al. |
| 8,172,163 | B2 | 5/2012 | Soliman Abdalla et al. |
| 8,398,007 | B2 | 3/2013 | Ito et al. |
| 8,448,518 | B2 | 5/2013 | Kass et al. |
| 8,480,859 | B2 | 7/2013 | Kostrov et al. |
| 8,726,532 | B2 | 5/2014 | Hogan |
| 9,050,604 | B1 | 6/2015 | Lansell et al. |
| 9,452,434 | B1 | 9/2016 | Lansell et al. |
| 2004/0063874 | A1 | 4/2004 | Muhle et al. |
| 2004/0200910 | A1 | 10/2004 | Graham et al. |
| 2007/0267527 | A1 | 11/2007 | Graham et al. |
| 2008/0226535 | A1 | 9/2008 | Park et al. |
| 2009/0241816 | A1 | 10/2009 | Taylor |
| 2010/0025506 | A1 | 2/2010 | Capelle, Jr. |
| 2010/0101978 | A1 | 4/2010 | Gordon et al. |
| 2011/0206593 | A1 | 8/2011 | Fahs, II et al. |
| 2011/0283705 | A1 | 11/2011 | Oliver |
| 2011/0303013 | A1 | 12/2011 | Kass |
| 2012/0230877 | A1 | 9/2012 | Pinchot |
| 2013/0221141 | A1 | 8/2013 | Zhang et al. |
| 2013/0315792 | A1 | 11/2013 | O'Dowd |
| 2013/0336845 | A1 | 12/2013 | Chu |
| 2014/0058095 | A1 | 2/2014 | Rende et al. |
| 2014/0058149 | A1* | 2/2014 | Negiz ...................... B01J 19/10 585/254 |
| 2014/0058178 | A1 | 2/2014 | Bedard et al. |
| 2014/0275687 | A1 | 9/2014 | Beene et al. |
| 2015/0352558 | A1* | 12/2015 | Lansell .................. B02C 19/18 241/1 |
| 2016/0303539 | A1 | 10/2016 | Lansell et al. |

FOREIGN PATENT DOCUMENTS

| | | |
|---|---|---|
| GB | 1037770 | 8/1966 |
| RU | 2 029 621 | 2/1995 |
| RU | 2 088 336 | 8/1997 |
| WO | WO 94/08719 | 4/1994 |
| WO | WO 97/33695 | 9/1997 |
| WO | 2008/083138 | 7/2008 |

OTHER PUBLICATIONS

Simpson, E., et al., Acoustic Performance of a Cylindrical Disk-Type Resonator, Journal of Sound and Vibration, (1978) 60(1), 151-156, Academic Press Inc. (London) Limited.

Narayanan, S., et al. "Acoustic characteristics of chamfered Hartmann whistles", Journal of Sound and Vibration, 330 (2011) 2470-2496, Elsevier, Ltd.

Narayanan, S. et al., Aero-acoustic features of internal and external chamfered Hartmann whistles: A comparative study, Journal of Sound and Vibration, 333 (2014) 774-787, Elsevier, Ltd.

International Preliminary Report on Patentability and the Written Opinion of the International Searching Authority as issued in International Patent Application No. PCT/US2015/034554, dated Sep. 3, 2015.

Hartmann, J. et al, Synchronisation of Air-Jet Generators with an Appendix on the Stem Generator, Det Kgl. Danske Videnskabernes Selskab. Matematisk-fysiske Meddelelser, Bd. 26, No. 10, 1951(39 pages).

English machine translation for FR 1048667 A (Dec. 1953).

U.S. Non-Final Office Action dated Jul. 21, 2016 in corresponding U.S. Appl. No. 14/823,890 (13 pages).

International Preliminary Report on Patentability and the Written Opinion of the International Searching Authority as issued in International Patent Application No. PCT/US2015/034548, dated Sep. 8, 2015.

International Search Report and Written Opinion dated Sep. 26, 2016 in corresponding International Patent Application No. PCT/US2016/046641.

Final Office Action dated Dec. 6, 2016 in corresponding U.S. Appl. No. 14/298,877 (10 pages).

M. Reader-Harris, Orifice Plates and Venturi Tubes, Chapter 3: Venturi Tube Design, 2015, pp. 77-96.

\* cited by examiner

SYSTEMS AND METHODS FOR GENERATING STEAM BY CREATING SHOCKWAVES IN A SUPERSONIC GASEOUS VORTEX

FIELD

This disclosure relates to systems and methods for generating steam using an apparatus that creates shockwaves in a supersonic gaseous vortex.

BACKGROUND

In any non-nuclear power station or ship operating on the Brayton Cycle, the cost of the steam boilers is one of the major capital costs. Shipping companies which used to operate on the Brayton cycle in their ships have switched to the Otto or Diesel cycle because they can operate at 50-54% efficiency. Conventional boilers occupy considerable real estate and are involved in most of the legislation regarding permitting for power stations. They have some inherent disadvantages, which are taken for granted in the power industry. Because the boiler tubes holding steam can only accept a relatively small amount of heat per unit area, the area of boiler tubes in a large power station is quite considerable. The heat losses through the outside of the boiler itself are a major problem in design and operation. There is a significant volume of heat carried away in the ash, but by far the major heat loss from the boiler is up the chimney. Even with economisers, which are essentially a secondary boiler used to recover the low-grade heat after the main boiler, the flue gases are still quite hot, and represent the most significant loss of energy in the whole boiler system.

Steam moderated combustion is a technique that has been employed for over one hundred years in steam engines and steam powered generators. The exhaust steam from the pistons driving the wheels in a classical steam engine is vented up the exhaust stack of the steam engine primarily to assist in the draft through the combustion chamber but it has the added benefit of being catalyzed by the carbon particles present in the exhaust and breaking down into hydrogen and carbon monoxide which is then combusted. This results in much lower exhaust emissions from the steam engine, and a significant increase in the draft in the boiler and hence the rate of combustion. The reduction in soot is a feature which is only recently appreciated. Many boilers running on dirty fuel use either continuous or pulsed steam injection to clean the fire tubes. This steam injection keeps the interior of the boiler clean but also assists in the catalytic breakdown of large soot particles which would otherwise be ejected from the exhaust stack.

Modern steam moderated combustion has two principally different aims. One is to increase the efficiency of combustion of problematic fuels. The other relates to oxygen (instead of air)-assisted combustion to generate steam and carbon dioxide without the nitrogen diluent associated with air combustion. The carbon dioxide so produced is not diluted with nitrogen and is readily separated using a variety of commonly available methods. The carbon dioxide so produced is then often sequestered in the ground.

There are a number of flare gas systems that are designed primarily to reduce or ameliorate the black smoke generated by flares. The auto ignition temperature of most hydrocarbon fuels is between about 300° C. and about 650° C. and it is not commonly realized in the industry that, if the steam is above 700° C., even if the fuel air ratios are not correct, ignition and combustion will proceed without an external ignition source.

Steam or water injection has been commonly employed since the advent of internal combustion engines. Modern heavy fuel ship engines use water or steam injection at different phases of the typical two stoke cycle to once again aid in the clean combustion of low rank fuels and increase the overall thermodynamic efficiency.

Electrically assisted combustion systems involve an exchange of electrons between the fuel and the oxygen in the air. This simple fact is quite often ignored in the fundamental design of combustion systems. Many combustion engineers know that something like this is necessary for stable combustion and become experts in designing flame front plates or other devices which are not commonly realized as electron donors. There are a number of companies that offer electrically assisted combustion. These systems are used when for whatever reason the combustion is not stable. With the addition of appropriate voltages amperages and in the right position, a given burner flame can be moderated or controlled across a very wide fuel/air ratio at a wide variety of pressures. If a given burner is driven too hard, then there is invariably a very significant Joule Thompson cooling effect across the burner. This quite often results in the burner flame being extinguished because the fuel and air mix is reduced below the auto ignition temperature. By injecting electricity into the burner at the appropriate place a given burner can be stabilized and run efficiently on inconsistent fuel rates and fuel/air ratios. With the injection of electricity, the effective auto ignition temperature may be dropped by about 2° C. to 300° C. Electrical assistance in the combustor or burner may lead to very high turndown ratios of better than 10-to-1.

A number of companies around the world have patented and developed ultrasonically assisted combustion burners with a view to be able to efficiently combust low rank coals and shale oil directly. These ultrasonic combustors effectively fragment the fuel and mix it thoroughly with the air giving more efficient fuel utilization and more complete combustion. Ultrasonic burners are typically much smaller than conventional burners of the same output because of the fuel fragmentation and a very thorough mixing in a very short flight path and hence a much smaller burner. Ultrasonic burners also enable the efficient combustion of oil and water emulsions which under normal circumstances would be nonflammable. Ultrasonic burners are also used to thoroughly mix limestone and other Sulphur scavengers with high Sulphur fuel which reduces the need for post-combustion gas cleanup.

Steam eductors have been around for over 100 years and at first glance the principals involved seem quite counterintuitive. Water typically is pumped into the boiler in boiler systems to replace the water lost into the steam which is used in whatever application is needed. The modern approach simply is to a use high-pressure water pump. However, in the past a steam eductor was commonly used to pump freshwater back into the boiler using the steam pressure in the boiler. This can be considered counterintuitive because one may wonder how the steam pressure in the boiler can be used to pump water back into the boiler. With the use of a steam educator, which comprises one or more venturies in series, the water is accelerated up to the point where its inertia is high enough to overcome pressure inside the boiler. In essence, one is virtually lifting oneself by pulling on one's bootstraps. This same principle can be used to compress air. With the use of suitable venturi, steam may be used to entrain air and thereby compress it typically up to half the pressure of the incoming steam.

For example, if the steam pressure is 60 bar or 1000 psi, then it may be used to compress an equivalent weight of air of about 30 bar or 500 psi. The actual pressures delivered depend on a number of factors but this is presented here solely as a general rule.

SUMMARY

One aspect of the present disclosure relates to a system configured for generating steam using an apparatus that creates shockwaves in a supersonic gaseous vortex. The steam cycle system as described herein may have the potential to operate at better than 60% efficiency, and because of the very small quantity of water used relative to current systems, the system is believed to be much safer than current systems. In addition, the system described herein has a much smaller footprint when compared to a comparable conventional boiler system of the same output. The system may be configured to be portable or containerized. The present disclosure addresses efficiency issues associated with heat loss, thus reducing the capital cost to a fraction of that of a conventional boiler and improving the overall efficiency of the system.

The system may comprise an apparatus configured to generate steam and combine the steam with heat from combustion. The apparatus may include a chamber. The chamber may have an internal surface that is substantially axially symmetrical about a longitudinal axis. The chamber may be configured to receive fuel gas liquids or solids and/or oxygen containing gas. The chamber may be configured to pressurize the fuel gas liquids or solids and/or the oxygen containing gas. The chamber may be configured to heat the fuel gas liquids or solids and/or the oxygen containing gas to a temperature exceeding an auto-ignition temperature of the fuel and/or the oxygen containing gas.

The apparatus may include one or more inlets disposed at a first end of the chamber. The one or more inlets may be arranged to emit one or more of the fuel, the oxygen containing gas, or water. The fuel, the oxygen containing gas, or the water may be emitted as one or more jet streams. The one or more jet streams may be emitted tangentially to the internal surface of the chamber to effectuate a gaseous vortex rotating about the longitudinal axis within the chamber. The one or more inlets may comprise one or more inlet nozzles configured to accelerate the one or more jet streams to a supersonic velocity. The jet streams may be configured to impinge on an electrically isolated face of a cylinder arranged in a radial disposition such that the cylinders may be rotated and advanced into the chamber to account for wear. The cylinders also may have varying voltages, amperages, and waveforms applied to them to effectuate an enhanced catalytic effect at the point of impingement. This electrical enhancement of catalytic activity is commonly called the NEMCA effect.

The one or more inlet nozzles may be structured to adjustably control a frequency of shockwaves emitted from the one or more inlet nozzles into the gaseous vortex. The fuel gas and/or the oxygen containing gas of the first jet may breach the auto ignition temperature of the fuel and/or the oxygen containing gas. The water or extra steam may be injected into the chamber by the one or more inlets. The water may be injected into the chamber responsive to breach of the auto ignition temperature of the fuel gas and/or the oxygen containing gas. The water may be injected into the chamber such that internal chamber temperature is stabilized. The water may be converted into steam.

The apparatus may include an outlet. The outlet may be disposed proximal to the longitudinal axis at a second end of the chamber opposite from the first end. The outlet may be configured to emit one or both of product gases or the steam from the chamber.

These and other features, and characteristics of the embodiments, as well as the methods of operation and functions of the related structural elements and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and in the claims, the singular form of "a", "an", and "the" include plural referents unless the context clearly dictates otherwise.

DETAILED DESCRIPTION

Figure 1:
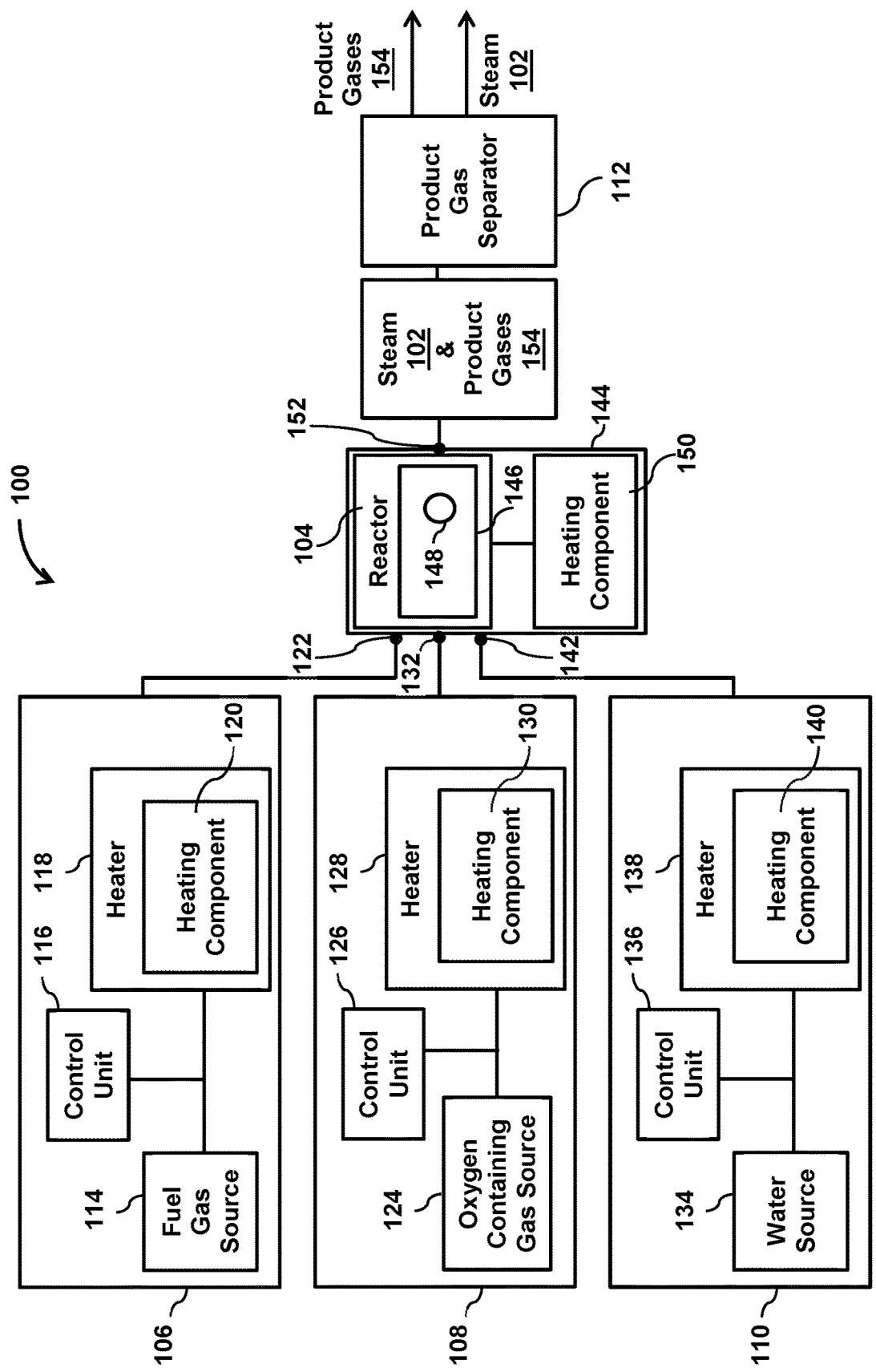
FIG. 1 illustrates a system configured for generating steam using an apparatus that creates shockwaves in a supersonic gaseous vortex, in accordance with one or more implementations.

In some implementations, the steam generator described herein has been designed from the outset to produce high temperature high-pressure steam from a very wide variety of fuel sources at very high efficiencies in the smallest possible configuration. Trials have been carried out on gas production and then combustion of household waste, Lignite coals, oil, saturated soil, and a wide variety of off specification hydrocarbon fuels quite often having very high water and dirt loading. In some implementations, the system has been designed to be as compact as possible with the highest possible output for a given size. This has resulted in the adoption of a variety of techniques for the promotion of efficient combustion in a small envelope whilst using conventional and nonconventional fuels. Some of the fuels that have been tested, whilst giving adequate energy output, are extremely abrasive and may not be practical for conventional combustion systems because of the high wear, although still could be used in accordance with the systems and apparatus herein.

There are, in some implementations, three basic manifestations of the steam generation apparatus: the first running on air, the second running on oxygen, and the third running on hydrogen derived from hydrocarbon gasification generated elsewhere together with oxygen. In some implementations, the hydrocarbon gasification is generated in a Pressure Swing Absorption (PSA) system.

In a first embodiment operating using air, the system may be configured to have the chosen fuel admitted to the chamber, together with steam/air above the auto ignition temperature. The actual temperature may be governed by the synergistic effect of a shockwave nozzle and Non Faradic Electro Magnetic Catalytic Activity (NEMCA) promoted on the surface of an impactor, as well as the pressure of the system, which can be within the range of about 10 to about 60 bar, or from about 20 to about 40 bar, or about 30 bar or about 500 PSI, or any pressure therebetween. Using the guidelines provided herein, a person having ordinary skill in the art will be capable of determining the actual temperature to use with various fuels.

The air pressure can be generated either in a conventional air compressor or it can be generated in an education venturi with steam being used as the propelling gas typically at a pressure within the range of from about 25 to about 85 bar, or from about 45 to about 75 bar, or about 60 bar or 1000 PSI, or any range therebetween. The venturis into the system may be configured to act as Hartman nozzles to promote a supersonic shockwave in the venturi to aid in the fragmentation of the fuel, the thorough mixing of the fuel air, and the stabilization of the flame front. The exothermic reaction between the fuel and the air can be ameliorated with the injection of more steam or water to prevent the thermal destruction of the system.

The apparatus may be configured to have the point of impact of the venturi gas stream impinge on the face of impactor cylinders. These impact cylinders, or "impactors," serve a number of functions. The expression "impact cylinders," the term "impactors," and the expression "replaceable wear parts," are used interchangeably throughout this description, and denote a surface upon which a stream (gas, solid, liquid, etc.) impinges. Impact cylinders are not necessarily cylindrical, but may be any desirable shape or size, as will be appreciated by those having ordinary skill in the art. The impact cylinders usually are electrically isolated from the main body of the reactor, and may act as electron donors that aid in the promotion and stabilization of the flame front. By having appropriate voltage, current and waveform, an electrically enhanced catalytic effect can be promoted on that surface. The impact cylinders also act as the primary point of wear for the fuel air mixture, which in the case of low rank fuels with high ash levels can be a source of wear and blockage problems for conventional burners. By applying appropriate voltage and frequency to these impact cylinders, combustion can be initiated at a temperature that is typically about 2° C. to 300° C. lower than what is normally achieved for a given fuel, or fuel-to-air ratio.

The first embodiment may produce steam, carbon dioxide, and nitrogen together with any ash present in the fuel. This combination of gases and solids would not typically be suitable for a conventional steam turbine, but is particularly useful for users of steam for the enhanced recovery of hydrocarbon fuels where the presence of the carbon dioxide enhances the solubility of the hydrocarbon fractions in the ground and leads to enhanced recovery.

The presence of nitrogen in the heating gas is not believed to pose a disadvantage. The small, relative quantities of ash may either be deposited in the substrata or may be added to the solids in the recovered hydrocarbons.

A second embodiment may be configured to run on oxygen instead of air. The oxygen in one embodiment can be derived from a pressure swing absorption system (PSA). Using oxygen has the advantage of not having nitrogen as a diluent. The steam so produced will still have ash and carbon dioxide present. A third system can be configured to run on hydrogen generated in a gasifier combined with oxygen generated in a PSA system. This system generates very high-quality steam at any conceivable temperature or pressure required.

FIG. 1 illustrates a system 100 configured for generating steam 102 using an apparatus 104 that creates shockwaves in a supersonic gaseous vortex, in accordance with one or more implementations. Apparatus 104 may also be referred to herein as a "reactor," although chemical reactions do not necessarily have to take place within apparatus 104. Apparatus 104 may be configured to facilitate the generation of steam 102 via one or more processes including: (a) steam 102 being produced as a product of combustion; (b) steam 102 being produced by injection of water into one or more components of system 100; and/or (c) steam 102 being produced via other processes. Combustion may include a high-temperature exothermic redox chemical reaction between a fuel (e.g., fuel gas) and an oxidant (e.g., oxygen containing gas) that produces oxidized gaseous products and/or other products of combustion. The fuel gas may include one or more of hydrogen, coal, natural gas, synthetic gas, oxygen, air, carbonaceous fuel, carbon dioxide, carbon monoxide, carbonaceous solid, carbonaceous liquid, clean hydrogen, Municipal Solid Waste (MSW), methane, hydrocarbon gas, hydrocarbon liquid, hydrocarbon solid, and/or other fuel gases. The oxygen containing gas may include one or more of oxygen, air, steam and/or other oxidant.

In some implementations, system 100 may include one or more of an apparatus 104, a fuel supply 106, an oxygen containing gas supply 108, a water supply 110, a product gas separator 112, and/or other components.

In some implementations, fuel gas supply 106 may be configured to supply one or more fuel gases to apparatus 104 and/or other components of system 100. In some implementations, fuel gas supply 106 may include one or more of a fuel gas source 114, a fuel gas control unit 116, a fuel gas heater 118, heating component(s) 120, and/or other components.

In some implementations, fuel gas source 114 may be configured to provide one or more fuel gases to system 100. Fuel gas source 114 may include one or more sources selected from a gas bottle, a flow generator, a pressurized tank, a pressure swing adsorption (PSA) gas system, a membrane gas separator, a cryogenic gas separator, a gas compressor, and/or other components.

In some implementations, fuel gas heater 118 may be configured to heat the fuel gas. Fuel gas heater 118 may include one or more heating components 120 and/or other components. The fuel gas heater 118 may be configured to receive fuel gas from fuel gas source 114. The heating component(s) 120 may be configured to increase a temperature and pressure of fuel gas within fuel gas heater 118. The fuel gas heater 118 may be configured to heat the fuel gas that is communicated to reactor 104. In some implementations, fuel gas heater 118 may include one or more valves configured to control the flow of the fuel gas within fuel gas heater 118. Fuel gas heater 118 may include one or more of a boiler, furnace, and/or other type of heater.

In some implementations, fuel gas heater 118 may be coupled (e.g., in communication with, and not necessarily physically connected) to a fuel gas control unit 116. Fuel gas control unit 116 may be configured to control flow of fuel gas to apparatus 104, to control heating component(s) 120, and/or to control other components of system 100. Valves may be used to control a rate of flow of fuel gas from fuel gas source 114 to fuel gas heater 118. In some implementations, one or more valves may be used to control a rate of flow of fuel gas from fuel gas source 114 to heating component(s) 120. In some implementations, a first portion of fuel gas provided by fuel gas supply 114 may be provided to fuel gas heater 118. A second portion of that fuel gas may be delivered by fuel gas source 114 to be burned as an energy source for heating component(s) 120. In some implementations, the fuel gas may be heated in fuel gas heater 118 beyond a critical point of the fuel gas such that the fuel gas may be in a super critical state.

In some implementations, oxygen containing gas supply 108 may be configured to supply oxygen containing gas to apparatus 104 and/or other components of system 100. Oxygen containing gas supply 108 may include one or more of an oxygen containing gas source 124, an oxygen containing gas control unit 126, an oxygen containing gas heater 128, heating component(s) 130, and/or other components.

In some implementations, oxygen containing gas source 124 may be configured to provide one or more oxygen-containing gases to apparatus 104. The oxygen-containing gas source 124 may include one or more sources selected from of a gas bottle, a flow generator, a pressurized tank, a pressure swing adsorption (PSA) gas system, a membrane gas separator, a cryogenic gas separator, a gas compressor, and/or other components.

In some implementations, oxygen containing gas heater 128 may include one or more heating components 130 and/or other components. The oxygen containing gas heater 128 may be configured to receive oxygen containing gas from oxygen containing gas source 124. The heating component(s) 130 may be configured to increase a temperature and/or pressure of oxygen containing gas within oxygen containing gas heater 128. The oxygen containing gas heater 128 may be configured to heat oxygen containing gas that is communicated to apparatus 104. In some implementations, oxygen containing gas heater 128 may comprise one or more valves configured to control the flow of the oxygen containing gas within oxygen containing gas heater 128. Oxygen containing gas heater 128 may be selected from one or more of a boiler, furnace, and/or other type of heater.

In some implementations, oxygen containing gas heater 128 may be coupled (e.g., in communication with, and not necessarily physically connected) to an oxygen containing gas control unit 126. Oxygen containing gas control unit 126 may be configured to control the flow of oxygen containing gas to one or both of reactor 104 and/or heating component(s) 130. Valves may be used to control a rate of flow of oxygen containing gas from oxygen containing gas source 124 to oxygen containing gas heater 128. In some implementations, one or more valves may be used to control a rate of flow of oxygen containing gas from oxygen containing gas source 124 to heating component(s) 130. In some implementations, a first portion of oxygen containing gas provided by oxygen containing gas supply 124 may be provided to oxygen containing gas heater 128. In some implementations, the oxygen containing gas may be heated in oxygen containing gas heater 128 beyond a critical point of the oxygen containing gas such that the oxygen containing gas may be in a super critical state.

In some implementations, additional fuel gases and/or oxygen containing gases may be introduced. In some implementations, differences in selection of fuel gases and/or oxygen containing gases may be utilized to control reaction conditions, products of reaction, and/or other characteristics of the products of the gaseous reaction. The fuel gas and/or the oxygen containing gas may have different velocities, temperatures, pressures, and/or other characteristics. By way of non-limiting example, a first fuel gas and/or oxygen containing gas may enter the reactor at a low temperature and/or pressure. A second fuel gas and/or oxygen containing gas may enter the reactor at a high temperature and/or pressure. The first fuel gas and/or oxygen containing gas and the second fuel gas and/or oxygen containing gas may enter the reactor at substantially different temperatures and/or pressures.

In some implementations, water supply 110 may be configured to supply water to one or more components of system 100. Water supply 110 may include one or more of a water source 134, a water control unit 136, a water heater 138, heating component(s) 140, and/or other components. The water source 134 may be configured to provide water to apparatus 104. Water source 134 may include one or more of a tank, a container, and/or other components.

In some implementations, water heater 138 may be configured to heat the water. Water heater 138 may include one or more heating components 140 and/or other components. Water heater 138 may be configured to receive water from water source 134. The heating component(s) 140 may be configured to increase a temperature and/or pressure of the water within water heater 138. Water heater 138 may be configured to heat water that is communicated to apparatus 104. In some implementations, water heater 138 may include one or more valves configured to control the flow of the water within water heater 138. Water heater 138 may include one or more of a boiler, furnace, and/or other type of heater.

In some implementations, water heater 138 may be coupled (e.g., in communication with, and not necessarily physically connected) to a water control unit 136. Water control unit 136 may be configured to control the flow of water to one or both of reactor 104 and/or heating component(s) 140. Valves may be used to control a rate of flow of water from water source 134 to water heater 138. In some implementations, one or more valves may be used to control a rate of flow of water from water source 134 to heating component(s) 140. In some implementations, the water may be heated in water heater 138 beyond a critical point of the water such that the water may be in a super critical state.

In some implementations, apparatus 104 may include one or more of a reactor system 144, a system control unit 146, a sensor 148, heating component(s) 150, an outlet 152, and/or other components. Reactor system 144 may be configured to control one or more of pressure, temperature, and rate of flow of the fuel gas, the oxygen containing gas, the water, and/or other properties of the fuel gas, the oxygen containing gas, and/or the water flow through one or more of heating component(s) 120, 130, 140, and/or 150, the valves, reactor 104, and/or other components. It will be appreciated and understood by those having ordinary skill in the art that the respective control units (116, 126, 136, 146, etc.) described herein would be combined in one control unit for the entire system 100, or may be separately included in certain configurations and in communication with one another.

In some implementations, reactor system 144 may be monitored by system control unit 146. System control unit 146 may be configured to control one or more of pressure, temperature, rate of flow, and/or other properties of reactor system 144. In some implementations, system control unit 146 may be configured to control frequency, amplitude, waveform, and/or other properties of gas flow.

In some implementations, sensor 148 may be configured to provide one or more signals conveying information associated with pressure, temperature, flow rate, and/or other information of the fuel gas, oxygen containing gas, and/or water, within system 100. Sensor 148 may be configured to provide a signal conveying information associated with temperature of one or more of the heating component(s) 120, 130, 140, and/or 150, the valves, fuel gas heater 118, fuel gas supply 114, oxygen containing gas heater 128, oxygen containing gas supply 108, water heater 138, water supply 110, apparatus 104, and/or other components of system 100. Sensor 148 may be placed in several locations within system 100. The position of sensor 148 within apparatus 104 in FIG. 1 is illustrative only and is not intended to be limiting. The illustration in FIG. 1 only depicts one sensor for clarity purposes and is not intended to be limiting. More than one sensor may be used in a variety of positions throughout system 100. In some implementations, system control unit 146 may be configured to control one or more operations associated with the fuel gas, oxygen containing gas, and/or water based on information associated with pressure, temperature, flow rate, and/or other properties within system 100 based on information provided by sensor 148.

In some implementations, outlet 152 may be configured to emit one or both of product gases 154 and/or steam 102 from apparatus 104. The products of combustion together with steam 102 may exit through outlet 152 into the product gas separator 112.

In some implementations, product gas separator 112 may be configured to receive product gases 154 and/or steam 102. Product gas separator 112 may be configured to separate product gases 154 and/or steam 102 into individual types and/or mixtures of gases. Product gas separator 112 may be facilitated by pressure swing adsorption (PSA). Product gases 154 may include one or more of superheated steam, pure steam, very clean steam, hydrogen, carbon dioxide, carbon monoxide, and/or other product gases. In some implementations, heat required for a steam reformer (51) A separate apparatus can be configured to produce hydrogen and carbon monoxide, which can then be combusted in a conventional boiler or can be combusted in a second apparatus together with water or steam which can then be added to a steam reformer. A "steam reformer" refers to a system or device that mixes carbon monoxide and steam together in appropriate ratios and under an appropriate temperature and pressure to thereby convert the carbon monoxide into carbon dioxide. Under the appropriate conditions the carbon in carbon monoxide catalytically strips the oxygen from the water and thereby delivers hydrogen. This process is a standard reforming operation in the petroleum industry for converting carbon monoxide into hydrogen of a similar calorific value, and may be derived from a separate process configured to increase the calorific value of the resultant gas output responsive to carbon dioxide levels being reduced to a range between about 0.05% and about 30% by weight.

Some features of system 100 may be the same as or similar to one or more features described in U.S. Pat. No. 9,050,604 filed on Jun. 6, 2014 and entitled "A REACTOR CONFIGURED TO FACILITATE CHEMICAL REACTIONS AND/OR COMMINUTION OF SOLID FEED MATERIALS," and U.S. patent application Ser. No. 14/719,303 filed on May 21, 2015 and entitled "REACTOR CONFIGURED TO FACILITATE CHEMICAL REACTIONS AND/OR COMMINUTION OF SOLID FEED MATERIALS," which are both incorporated herein by reference in their entireties.

Figure 2A:
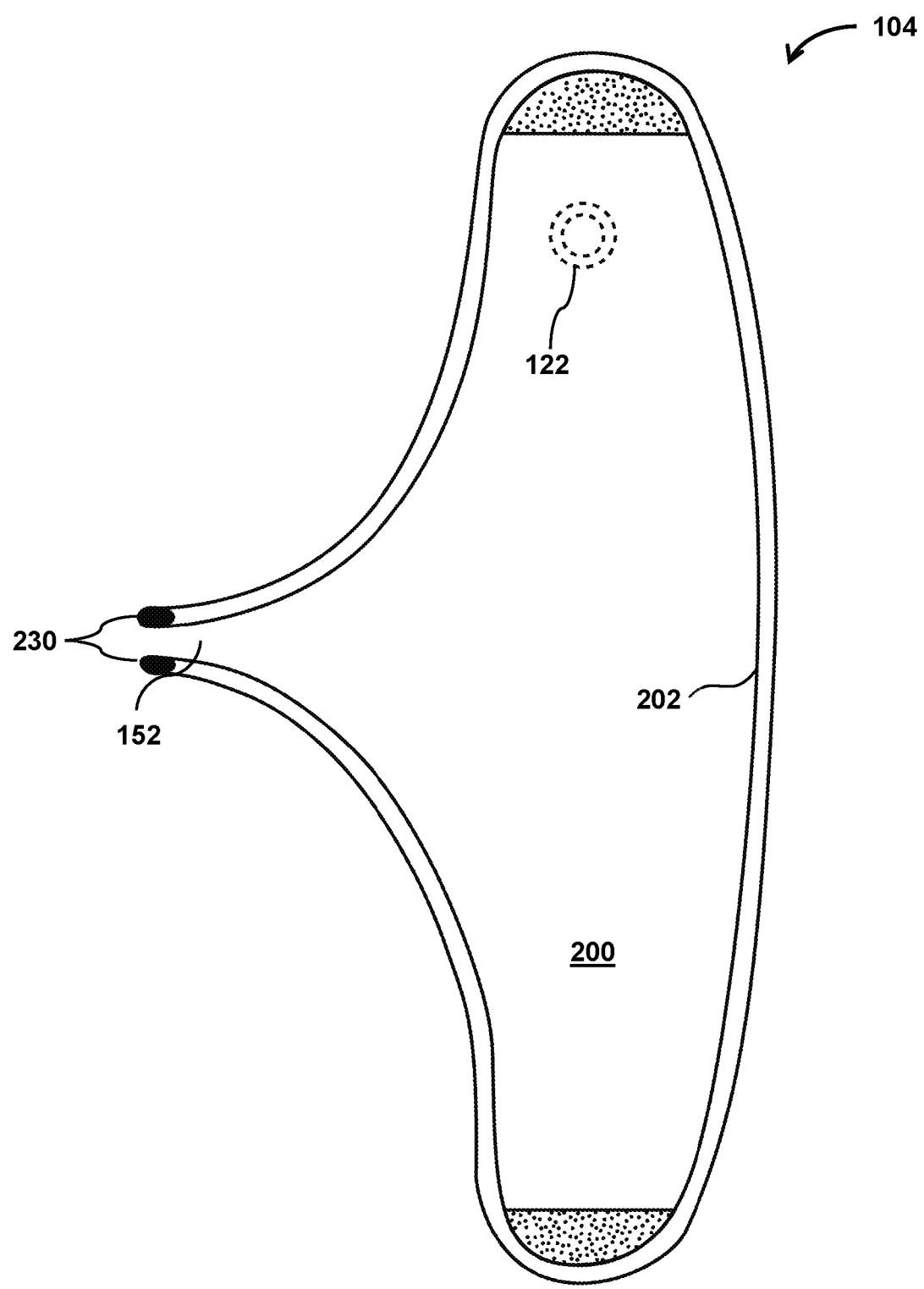
FIGS. 2A and 2B illustrate a side and a top view of an apparatus, respectively, in accordance with one or more implementations.
Figure 2B:
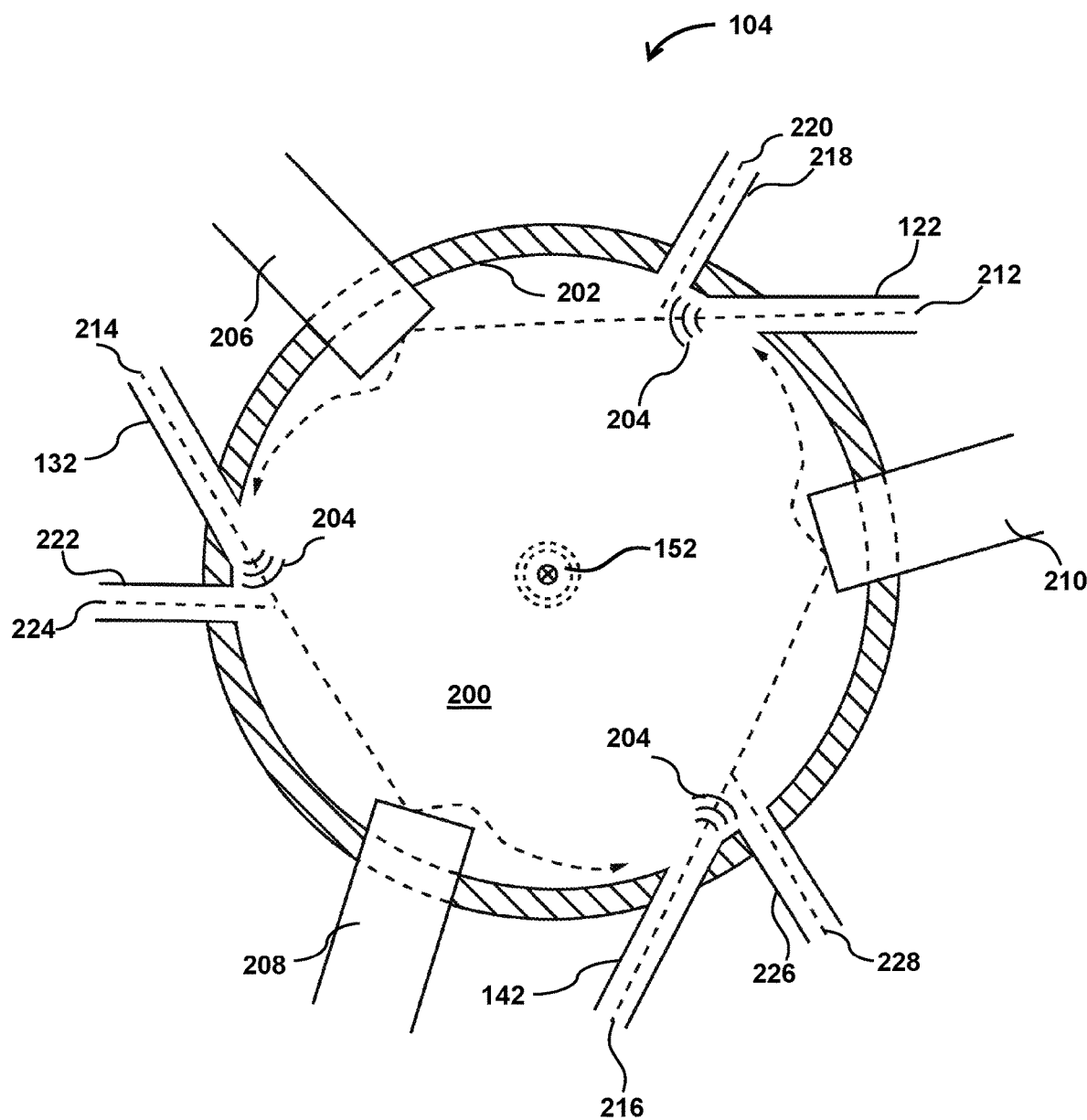

FIGS. 2A and 2B illustrate a side and a top view of apparatus or reactor 104, respectively, in accordance with one or more implementations. Reactor 104 may include one or more of a chamber 200, one or more inlets, one or more replaceable wear parts, an outlet 152, and/or other components. Reactor 104 may be configured to generate steam 102. Reactor 104 may be configured to combine steam 102 with heat from combustion. In some implementations, reactor 104 may be formed wholly or partially of heat and corrosion resistant materials. In some implementations, reactor 104 may be formed wholly or partially of mild steel, heat resistant alloys, silicon carbide, reaction bonded silicon carbide, silicon nitride, boron nitride, partially stabilized zirconia, a variety of cermets, and/or other materials. In some implementations, reactor 104 may be formed wholly or partially from material configured to be resistant to high-temperature, high-pressure carbon monoxide, hydrogen, steam, and/or various ash products.

In some implementations, chamber 200 may be configured to facilitate combustion. Chamber 200 may be configured to (1) receive fuel gas and/or oxygen containing gas, (2) pressurize the fuel gas and/or the oxygen containing gas, and/or (3) heat the fuel gas and/or the oxygen containing gas to a temperature exceeding an auto-ignition temperature of the fuel gas and/or the oxygen containing gas. Chamber 200 may include one or more of a first end, a second end, an internal surface 202, a longitudinal axis, and/or other components. In some implementations, chamber 200 may be cylindrical in shape. Chamber 200 may be shaped as a cone, a hemisphere, a horn-shape, and/or other shapes.

In some implementations, internal surface 202 and/or chamber 200 may be configured to receive one or more of a fuel gas, an oxygen containing gas, water, and/or other materials. Internal surface 202 may be substantially axially symmetrical about the longitudinal axis. The longitudinal axis may be disposed between the first end and the second end. The second end may be disposed opposite from the first end.

In some implementations, one or more inlets may be configured to introduce one or more of a fuel gas, an oxygen containing gas, water, and/or other materials into chamber 200. The one or more inlets may include a first inlet 122, a second inlet 132, a third inlet 142, and/or other inlets. One or more inlets may be positioned at the first end of chamber 200.

In some implementations, fuel gas may be introduced into chamber 200 via the one or more inlets, including first inlet 122 and/or other inlets. The fuel gas may facilitate combustion in chamber 200. The fuel gas may include one or more fuel gases selected from hydrogen, coal, natural gas, synthetic gas, oxygen, air, carbonaceous fuel, carbon dioxide, carbon monoxide, carbonaceous solid, carbonaceous liquid, clean hydrogen, Municipal Solid Waste (MSW), methane, hydrocarbon gas, hydrocarbon liquid, hydrocarbon solid, and/or other fuel gases. In some implementations, selection of the fuel gas may be responsive to desired outputs and/or products of combustion. Products of combustion may include one or more product gases 154. By way of non-limiting examples, there are many chemical reactions and more particularly those involving reduction of metal oxides, sulfides, sulphates, chlorides, or other halogenated metal complexes that can be used to produce a high value product gas 154. Using the guidelines provided herein, a person having ordinary skill in the art will be capable of selecting suitable fuel gas(es) depending on the desired product gas 154. Inputs received by reactor 104 may include oxygen, coal, MSW, and/or other suitable carbonaceous fuel and/or methane and/or other suitable hydrocarbon gas, liquid, and/or solid. In this implementation, the resulting product gases 154 may include hydrogen and/or carbon monoxide and in some implementations, may not include a high loading of nitrogen.

By way of a non-limiting example, responsive to reactor 104 receiving air and a carbonaceous fuel, the products of combustion and/or the steam 102 so produced may include carbon dioxide. By way of non-limiting example, responsive to very clean steam for a conventional steam turbine or steam required for further chemical reactions being a required output, inputs received by reactor 104 may include clean hydrogen having its flame temperature moderated by water injection.

In some implementations, oxygen containing gas may be introduced into chamber 200 via the one or more inlets, including second inlet 132, and/or other inlets. Oxygen containing gas may facilitate combustion in chamber 200. Oxygen containing gas may be selected from one or more of oxygen, air, and/or other oxidant. In some implementations, oxygen may be derived from oxygen-producing systems configured to produce oxygen from air (e.g., a pressure swing adsorption (PSA) device). Pressure swing adsorption (PSA) includes gas separation techniques for air separation, gas drying, hydrogen purification separation, methane purification, and/or other gas separation processes. PSA is used to separate some gas species from a mixture of gases under pressure according to the species' molecular characteristics and affinity for an adsorbent material. By way of non-limiting example, responsive to pure steam with a steam turbine or a chemical reaction being an output, reactor 104 may be fired with oxygen derived from a PSA device.

In some implementations, water may be introduced into chamber 200 via the one or more inlets, including third inlet 142, and/or other inlets. Water may be injected into chamber 200 to stabilize internal chamber temperature. Water may be heated prior to being injected into chamber 200. Water may not be heated prior to being injected into chamber 200. In some implementations, small quantities of water may be used. The quantity of water being utilized by system 100 at a given time may be in a range between about one liter per minute for a very small system and about 3 to about 5000 liters per minute for a 2 Gigawatt steam generator. Water may be configured to moderate extremely hot (e.g., hydrogen/oxygen) combustion, with a combustion temperature in excess of about 3000° C. down to typically about 1000° C. or a temperature that is below the corrosion or erosion temperature of the device. Water may be configured to prevent the internal chamber temperature from reaching thermal runaway. Thermal runaway may include conditions in which an increase in temperature causes a further increase in temperature. Responsive to water being injected into chamber 200, the water may be converted into steam 102.

In some implementations, chamber 200 may be configured to pressurize the fuel gas, oxygen containing gas, and/or other materials. Chamber 200 may be configured to heat the fuel gas, oxygen containing gas, and/or other materials that are introduced thereto via first inlet 122, a second inlet 132, a third inlet 142, and/or other inlets. The fuel gas, oxygen containing gas, and/or other materials may be heated to a temperature exceeding auto-ignition temperature. The auto-ignition temperature may correspond to the auto-ignition temperature of the fuel gas, oxygen containing gas, and/or the auto-ignition temperature of other materials. The auto-ignition temperature of a substance includes the lowest temperature at which the substance will spontaneously ignite in normal atmosphere without an external source of ignition, such as a flame or spark. Auto-ignition temperature may be required to supply the activation energy needed for combustion. The temperature at which a chemical will ignite may decrease as the pressure and/or oxygen concentration increases. Reactor 104 and/or chamber 200 may be configured to generate temperatures in a range between about 80° C. and about 1200° C. Reactor 104 and/or chamber 200 may be configured to generate pressures in a range between about 0.1 megapascals (MPa) and about 30 megapascals (MPa), or any value therebetween.

In some implementations, reactor 104 and/or chamber 200 may be configured to use all or nearly all of the heat derived from combustion and/or combine the heat with steam 102 produced in chamber 200. In some implementations, reactor 104 may be configured to generate steam 102, product gases 154, and/or other products of combustion without the use of a chimney, flue, and/or other exhaust component. Reactor 104 and/or chamber 200 may be configured to generate steam 102 at temperatures and/or pressures above the supercritical region for steam 102 (e.g., temperatures up to about 1600 degrees Celsius and pressures in excess of 25 MPa).

In some implementations, the one or more inlets may introduce one or more of the fuel gas, oxygen containing gas, water, and/or other materials as one or more jet streams. One or more inlets may be arranged to introduce one or more jet streams tangentially to internal surface 202 of chamber 200. One or more inlets may be arranged so as to effectuate a gaseous vortex to rotate about the longitudinal axis within chamber 200.

In some implementations, one or more inlets may include one or more inlet nozzles. One or more inlet nozzles may include a first inlet nozzle, a second inlet nozzle, a third inlet nozzle, and/or other inlet nozzles. In some implementations, the first inlet nozzle may be disposed within first inlet 122. In some implementations, the second inlet nozzle may be disposed within second inlet 132. In some implementations, the third inlet nozzle may be disposed within third inlet 142. An exemplary inlet nozzle configuration is shown in connection with FIGS. 4-6.

Exemplary implementations of an inlet nozzle are disclosed in U.S. patent application Ser. No. 14/298,877 filed on Jun. 6, 2014, and entitled "SYSTEMS AND METHODS FOR PROCESSING SOLID MATERIALS USING SHOCKWAVES PRODUCED IN A SUPERSONIC GASEOUS VORTEX," and U.S. patent application Ser. No. 14/690,149 filed on Apr. 17, 2015, and entitled "SYSTEMS AND METHODS FOR FACILITATING REACTIONS IN GASES USING SHOCKWAVES PRODUCED IN A SUPERSONIC GASEOUS VORTEX," which are both incorporated herein by reference in their entireties.

In some implementations, one or more inlet nozzles may be configured to accelerate one or more jet streams to a supersonic velocity. One or more inlet nozzles may be structured to adjustably control a frequency of shockwaves 204. Frequency of shockwaves 204 may be emitted from one or more inlet nozzles. Frequency of shockwaves 204 may be emitted into the gaseous vortex.

In some implementations, reactor 104 may include one or more replaceable wear parts, or impactors, or impact cylinders. One or more replaceable wear parts may include a first replaceable wear part 206, a second replaceable wear part 208, a third replaceable wear part 210, and/or other replaceable wear parts. In some implementations, one or more replaceable wear parts may be configured to protect internal surface 202. One or more replaceable wear parts may be disposed within chamber 200. One or more replaceable wear parts may be disposed such that one or more jet streams impinges on one or more replaceable wear parts. As one or more jet streams is emitted from the one or more inlets, one or more jet streams may impinge on one or more replaceable wear parts instead of impinging on internal surface 202 of chamber 200. One or more jet streams may include a first jet 212, a second jet 214, a third jet 216, and/or other jets. By way of non-limiting example, first replaceable wear part 206 may be configured to protect internal surface 202. First replaceable wear part 206 may be disposed within chamber 200. First replaceable wear part 206 may be disposed such that first jet 212 impinges on first replaceable wear part 206. As first jet 212 is emitted from one or more inlets, first jet 212 may impinge on first replaceable wear part 206 instead of impinging on internal surface 202 of chamber 200.

Exemplary implementations of replaceable wear part(s) are disclosed in U.S. patent application Ser. No. 14/690,111 filed on Apr. 17, 2015, and entitled "PROVIDING WEAR RESISTANCE IN A REACTOR CONFIGURED TO FACILITATE CHEMICAL REACTIONS AND/OR COMMINUTION OF SOLID FEED MATERIALS USING SHOCKWAVES CREATED IN A SUPERSONIC GASEOUS VORTEX," and U.S. patent application Ser. No. 14/823,890 filed on Aug. 11, 2015 and entitled "SYSTEMS AND METHODS FOR GENERATING STEAM USING A REACTOR THAT CREATES SHOCKWAVES IN A SUPERSONIC GASEOUS VORTEX," the disclosures of which are incorporated herein by reference in their entireties.

In some implementations, one or more inlets may include first inlet 122. First inlet 122 may be configured to introduce first jet 212. First jet 212 may include one or more of the fuel gas, oxygen containing gas, water, and/or other materials. In some implementations, first inlet 122 may include a first inlet nozzle. The first inlet nozzle may be configured to accelerate first jet 212 to a supersonic velocity. First inlet nozzle may be structured to adjustably control the frequency of shockwaves 204 emitted from the first inlet nozzle into the gaseous vortex.

In some implementations, reactor 104 may include a first steering inlet 218. First steering inlet 218 may be configured to control the direction of first jet 212. First steering inlet 218 may be disposed proximal to first inlet 122. First steering inlet 218 may be configured to introduce a first steering jet 220 into chamber 200. First steering jet 220 may be configured to produce a "steering effect" to first jet 212. First steering jet 220 may be introduced to control the direction of first jet 212 such that first jet 212 may be directed to a particular direction to even out wear in chamber 200. To achieve this, first steering inlet 218 may be disposed such that first steering jet 220 may have an axial flow configured to intercept first jet 212 introduced by first inlet 122. As illustrated, first steering inlet 218 may be employed to "steer" first jet 212 towards a desired area of internal surface 202 of chamber 200. By way of non-limiting example, first steering inlet 218 may be employed to steer first jet 212 towards first replaceable wear part 206. In some implementations, first steering jet 220 may be configured to introduce eddy current and/or interference currents into chamber 200 to vary the shockwave effects of reactor 104.

In some implementations, one or more inlets may include first inlet 122 and/or second inlet 132. Second inlet 132 may be disposed at first end of chamber 200. Second inlet 132 may be arranged to introduce fuel gas, oxygen containing gas, or water as second jet 214 substantially tangentially to internal surface 202 of chamber 200. Second jet 214 may effectuate a gaseous vortex to rotate about the longitudinal axis within chamber 200. Second inlet 132 may include a second inlet nozzle. The second inlet nozzle may be configured to accelerate second jet 214 to a supersonic velocity. The second inlet nozzle may be structured to adjustably control frequency of shockwaves 204 emitted from the second inlet nozzle into the gaseous vortex.

In some implementations, first inlet 122 may be configured to introduce one or both of the fuel gas and/or oxygen containing gas. Second inlet 132 may be configured to introduce water. In some implementations, reactor 104 may include a second steering inlet 222. Second steering inlet 222 may be configured to control the direction of second jet 214. Second steering inlet 222 may be disposed proximal to second inlet 132. Second steering inlet 222 may be configured to introduce a second steering jet 224 into chamber 200. Second steering jet 224 may be configured to produce a "steering effect" to second jet 214. Second steering jet 224 may be introduced to control the direction of second jet 214 such that second jet 214 may be directed to a particular direction to even out wear in chamber 200. To achieve this, second steering inlet 222 may be disposed such that second steering jet 224 may have an axial flow configured to intercept second jet 214 introduced by second inlet 132. As illustrated, second steering inlet 222 may be employed to "steer" second jet 214 towards a desired area of internal surface 202 of chamber 200. By way of non-limiting example, second steering inlet 222 may be employed to steer second jet 214 towards second replaceable wear part 208. In some implementations, second steering jet 224 may be configured to introduce eddy current and/or interference currents into chamber 200 to vary the shockwave effects of reactor 104.

In some implementations, one or more inlets may include first inlet 122, second inlet 132, and/or third inlet 142. Third inlet 142 may be positioned at the first end of chamber 200. Third inlet 142 may be arranged to introduce fuel gas, oxygen containing gas, and/or water as third jet 216. Third jet 216 may be introduced substantially tangentially to internal surface 202 of chamber 200 to effectuate the gaseous vortex rotating about the longitudinal axis within chamber 200. Third inlet 142 may comprise a third inlet nozzle. The third inlet nozzle may be configured to accelerate third jet 216 to a supersonic velocity. The third inlet nozzle may be structured to adjustably control frequency of shockwaves 204 emitted from the third inlet nozzle into the gaseous vortex.

In some implementations, first inlet 122 may be configured to introduce fuel gas, second inlet 132 may be configured to introduce oxygen containing gas, and third inlet 142 may be configured to introduce water. In some implementations, reactor 104 may include a third steering inlet 226. Third steering inlet 226 may be configured to control the direction of third jet 216. Third steering inlet 226 may be disposed proximal to third inlet 142. Third steering inlet 226 may be configured to introduce a third steering jet 228 into chamber 200. Third steering jet 228 may be configured to produce a "steering effect" to third jet 216. Third steering jet 228 may be introduced to control the direction of third jet 216 such that third jet 216 may be directed to a particular direction to even out wear in chamber 200. To achieve this, third steering inlet 226 may be disposed such that third steering jet 228 may have an axial flow configured to intercept third jet 216 introduced by third inlet 142. As illustrated, third steering inlet 226 may be employed to "steer" third jet 216 towards a desired area of internal surface 202 of chamber 200. By way of non-limiting example, third steering inlet 226 may be employed to steer third jet 216 towards third replaceable wear part 210. In some implementations, third steering jet 228 may be configured to introduce eddy current and/or interference currents into chamber 200 to vary the shockwave effects of reactor 104.

In some implementations, chamber 200 may include outlet 152. Outlet 152 may be configured to emit one or both of product gases 154 and/or steam 102 from chamber 200. Outlet 152 may be disposed proximal to the longitudinal axis of chamber 200. Outlet 152 may be disposed at the second end of chamber 200. In some implementations, outlet 152 may include one or more of an outlet nozzle 230 disposed within outlet 152. In some implementations, the products of combustion together with steam 102 may exit through outlet nozzle 230 into the process, which consumes the steam 102, so produced.

Figure 3:
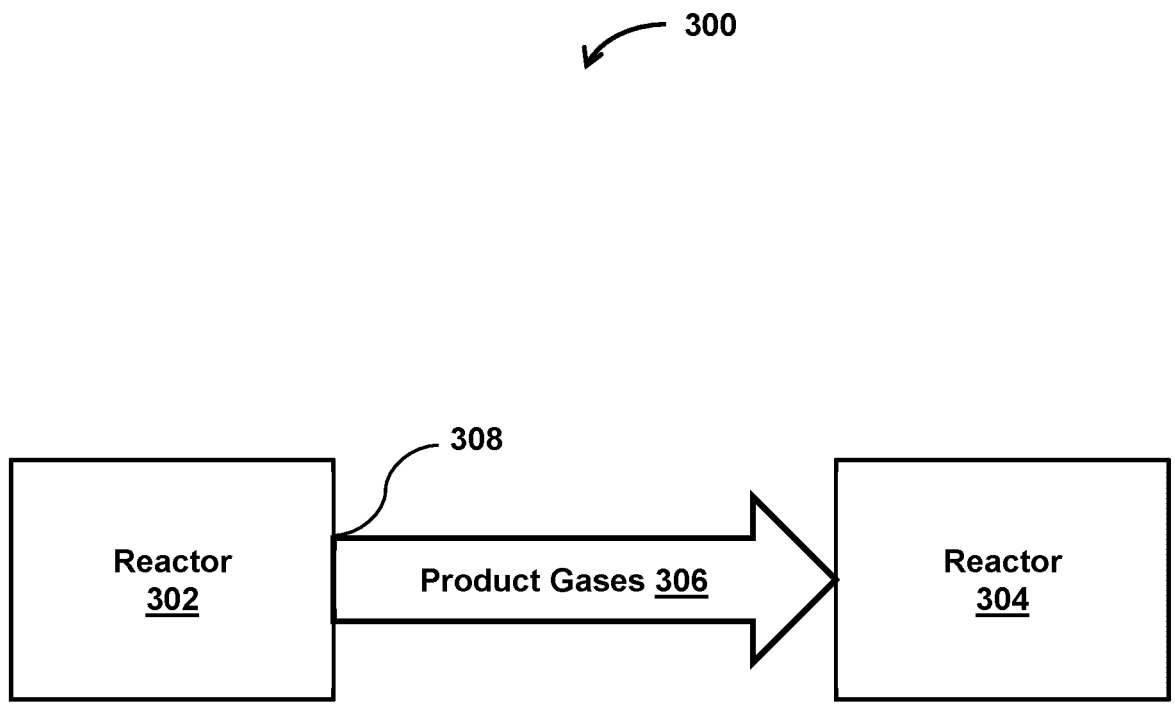
FIG. 3 illustrates a system wherein an apparatus may be coupled to an additional apparatus, in accordance with one or more implementations.

FIG. 3 illustrates a system 300 wherein an apparatus or reactor 302 may be coupled to an additional apparatus or reactor 304, in accordance with one or more implementations. Reactor 302 may be configured to be coupled to additional reactor 304. Additional reactor 304 may be coupled to reactor 302 such that product gases 306 that are the same as or similar to the product gases 154 as described in connection with FIG. 1, may be emitted from outlet 308 of reactor 302 into additional reactor 304 as a fuel gas. In some implementations, the fuel gas may include carbon monoxide and/or hydrogen. The fuel gas may be separated via use of membrane technology and/or other systems for hydrogen separation that are known to those having ordinary skill in the art. In some implementations, recovered carbon monoxide may be reformed with steam 102 in additional reactor 304 by converting the carbon monoxide into carbon dioxide and liberating the hydrogen.

In some implementations, mixed hydrogen and carbon dioxide may be separated by a membrane system and/or other methods. The separated hydrogen may be added to the original stream of hydrogen. This method may facilitate converting carbonaceous solid, liquid, and/or gaseous fuel into hydrogen. The output hydrogen may be used in one or more applications including feedstock in the chemical industry, transport of fuel internal combustion engines (ICE), fuel cell applications, and/or other applications.

System 300 may be configured for comminution and/or gasification of various materials including Municipal Solid Waste (MSW), industrial waste, run of mine, mine tailings, and/or other materials. System 300 may be configured for the treatment of contaminated soils and/or other similar mine tailings wherein the carbonaceous material may be gasified and/or chloride and/or sulfurous materials that may be present in the material may be rendered innocuous responsive to being introduced together with limestone and/or other suitable absorbents configured to combine with the chlorine and/or sulfur. System 300 may be used with the addition of a known quantity of polychlorinated biphenyls (PCBs) and a known quantity of heavy metals wherein the PCB concentration has been reduced to below permissible limits of, for example 1 ppm. System 300 may facilitate heavy metals being rendered non-leachable and/or rendering contaminated soil nontoxic for PCBs and/or heavy metal contamination.

Figure 4:
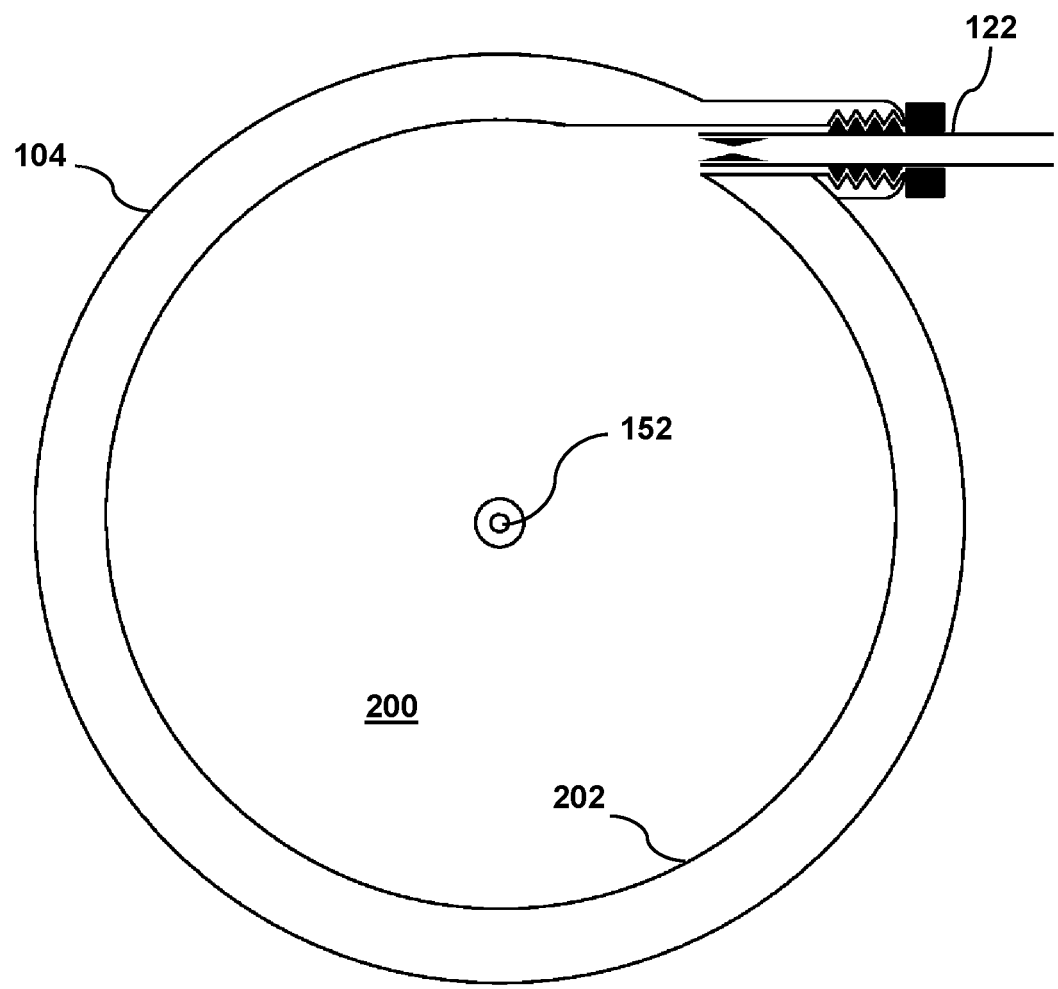
FIG. 4 illustrates a rear view of an apparatus, in accordance with one or more implementations.

FIG. 4 illustrates a rear view of reactor 104, in accordance with one or more implementations. The reactor 104 may include a chamber 200 centered on a longitudinal axis that is normal to the cross-section. In some implementations, a portion of the chamber 200 may be shaped as a cylinder. The chamber 200 may be formed of various materials. The chamber 200 may be formed of a ridged material. The chamber 200 may be formed of a thermally conductive material. The chamber 200 may be formed of an electrically conductive material. According to some implementations, chamber 200 may be formed wholly or partially of steel, iron, iron alloys, silicon carbide, partially stabilized zirconia (PSZ), fused alumina, tungsten carbide, boron nitride, carbides, nitrides, ceramics, silicates, geopolymers, metallic alloys, other alloys, and/or other materials. In some implementations, an internal surface 202 of chamber 200 may be coated with one or more coatings. An exemplary coating may be configured to prevent physical or chemical wear to internal surface 202 of chamber 200. In some implementations, a coating may be configured to promote a chemical reaction within chamber 200. An example of a coating that may promote a chemical reaction may include one or more of iron, nickel, ruthenium, rhodium, platinum, palladium, cobalt, other transition metals and their alloys, compounds, oxides (e.g., the lanthanide series and their compounds, alloys, and/or oxides), and/or other materials.

In some implementations, first inlet 122 may be configured to introduce a high-velocity jet stream into chamber 200. First inlet 122 may be disposed and arranged so as to effectuate a vortex of the jet stream circulating within chamber 200. The vortex may rotate about the longitudinal axis of chamber 200. First inlet 122 may be disposed so that the jet stream is directed substantially perpendicular to the longitudinal axis of chamber 200. First inlet 122 may be disposed so that the jet stream is directed substantially tangential to an internal surface of the substantially circular cross-section of the chamber, as illustrated in FIG. 4.

The jet stream introduced by first inlet 122 may include any number of gaseous materials. In some implementations, the gas may include a reduced gas (e.g., a gas with a low oxidation number and/or high reduction) which is often hydrogen-rich. The gas may include one or more of steam, methane, ethane, propane, butane, pentane, ammonia, hydrogen, carbon monoxide, carbon dioxide, oxygen, nitrogen, chlorine, fluorine, ethene, hydrogen sulphide, acetylene, and/or other gases. The gas may be a vapor. The gas may be superheated. In some implementations, the gas may be heated beyond a critical point, and/or compressed above a critical pressure so that the gas becomes a superheated gas, compressible fluid, and/or a super critical fluid.

Figure 5:
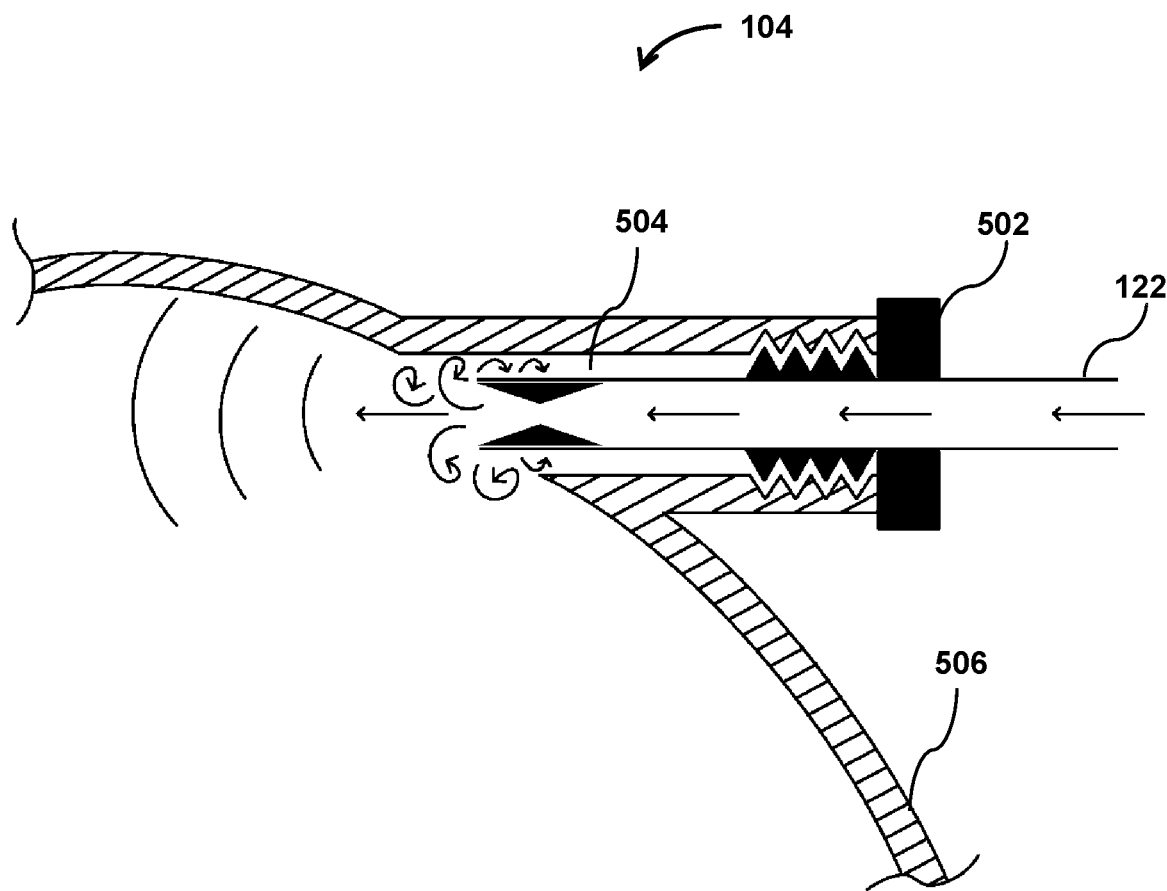
FIG. 5 illustrates a detailed view of a gas inlet of an apparatus, in accordance with one or more implementations.

FIG. 5 provides a more detailed view of a first inlet 122 of apparatus 104, in accordance with one or more implementations. First inlet 122 may include a first inlet nozzle 502 positioned within first inlet 122. The first inlet nozzle 502 may be configured to be secured in place by screw threads or other mechanisms capable of securing first inlet nozzle 502 within or on first inlet 122. The first inlet nozzle 502 may be configured to accelerate the jet stream being introduced into chamber 506. In exemplary implementations, first inlet nozzle 502 may be configured to introduce the jet stream at a supersonic speed. The first inlet nozzle 502 may be configured to produce shockwaves in the jet stream emitted from first inlet nozzle 502. First inlet 122 may include an annular cavity 504 disposed about first inlet nozzle 502. The annular cavity 504 may be configured such that the jet stream emitted from first inlet nozzle 502 resonates within annular cavity 504.

Figure 6:
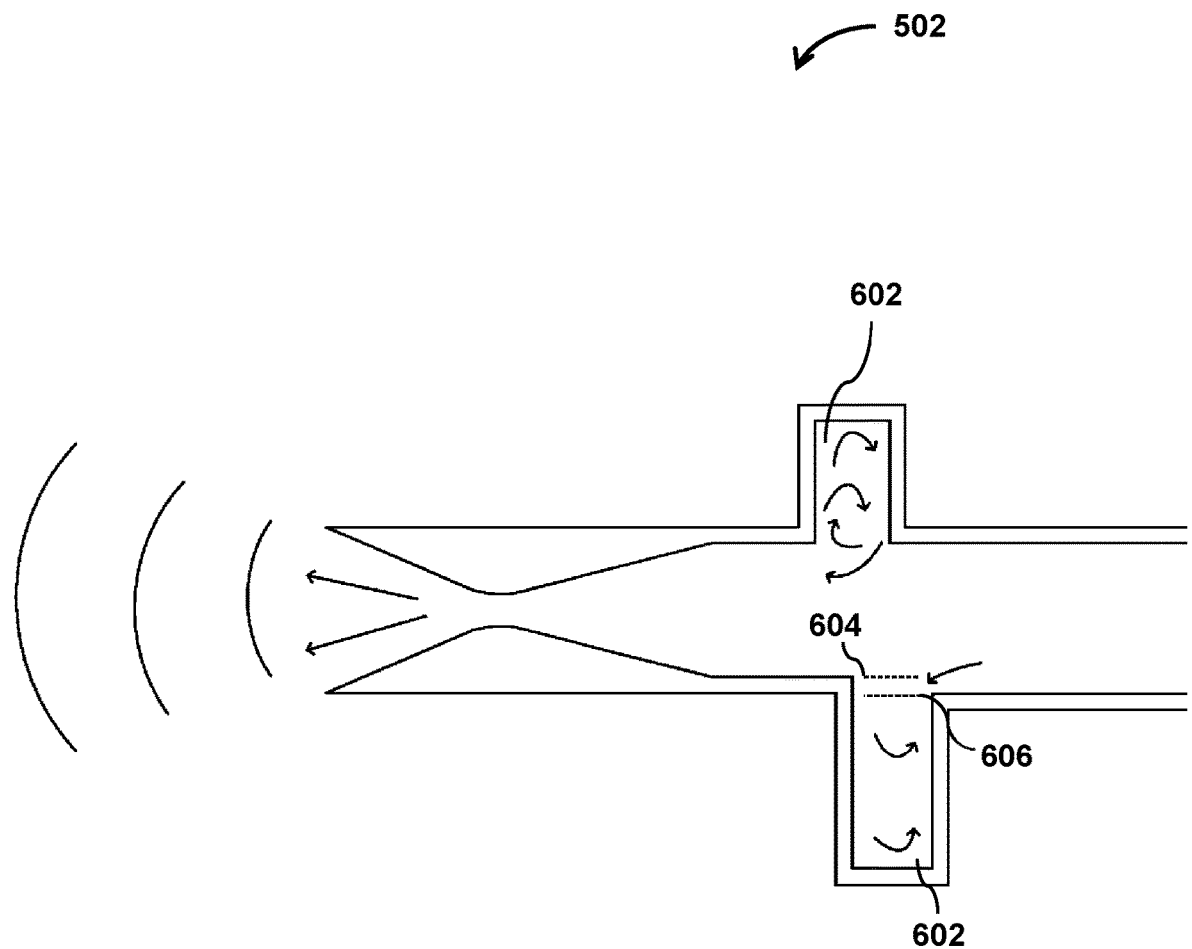
FIG. 6 illustrates a detailed view of an inlet nozzle of the gas inlet, in accordance with one or more implementations.

FIG. 6 illustrates a detailed view of first inlet nozzle 502 of first inlet 122, in accordance with one or more implementations. The first inlet nozzle 502 may include one or more resonator cylinders 602. A given resonator cylinder 602 may be disposed within first inlet nozzle 502 and may be oriented perpendicular to the main flow of gas through first inlet nozzle 502. A given resonator cylinder 602 may be configured such that gas pressure pulses resonate within the given resonator cylinder 602 to induce shockwaves within first inlet nozzle 502. Shockwaves occurring within first inlet nozzle 502 may propagate out of first inlet nozzle 502 into chamber 200. Different resonator cylinders 602 may have different sizes so that corresponding different resonant frequencies result in shockwaves occurring at different frequencies. Offset of a lip 604 relative to another lip 606 of a given resonator cylinder 602 may induce pumping in the given resonator cylinder 602.

In some implementations, first inlet nozzle 502 may be configured to produce shockwaves, and/or harmonics in the gas, and/or chamber 200. The first inlet nozzle 502 may include one or more of a Hartmann-Sprenger tube, a Hartmann generator, a Hartmann oscillator, a nozzle utilizing one or more electronically controlled piezoelectric or magnostrictive transducers to control the shockwaves, a motorized rotating nozzle similar to a siren, and/or other types of nozzles. A capacitor discharge spark may be used to induce a shockwave. A Hartmann generator may include a device in which shockwaves generated at the edges of a nozzle by a supersonic gas jet resonate with the opening of a small cylindrical pipe, placed opposite the nozzle, to produce powerful ultrasonic sound waves. A Hartmann oscillator may include a gas-jet radiator of sonic and ultrasonic waves. The oscillator may include a nozzle from which gas under a pressure p>0.2 meganewtons per square meter (1.93 atmospheres) emerges at supersonic speed.

In the process, the gas jet may create compression and rarefaction waves. If a resonator is placed in this flow coaxially with the nozzle at a certain distance, sonic and ultrasonic waves may be radiated. The frequency of the acoustic radiation may be a function of the distance between the nozzle and the resonator, as well as the size of the resonator. Hartmann oscillators may radiate up to several dozen watts of acoustic power. If compressed air (from a tank or compressor) is blown through the nozzle, frequencies ranging from 5 or 6 kilohertz up to 120 kilohertz may be obtained. By using hydrogen in place of air, frequencies up to 500 kilohertz may be reached.

In some implementations, one or more inlet nozzles may be an acoustic device. One or more inlet nozzles may be designed to maximize the pressure differences that a given particle may experience for a given time. Current supersonic nozzles may produce a very wide spectrum frequency distribution per unit area or acoustic flow velocity. The acoustic component of the one or more inlet nozzles may generate variations in pressure experienced across the one or more inlet nozzles due to oscillation. Oscillation may be generated by one or more Hartman type devices. One or more Hartman type devices may be disposed at the one or more inlet nozzles. One or more inlet nozzles may include converging nozzles, diverging nozzles, and/or other types of nozzles. One or more Hartman type devices may be introduced in advance of one or more inlet nozzles such that the one or more inlet nozzles are not exposed to wear. One or more inlet nozzles may be designed to couple to particles and/or chemical reactions processed in chamber 200 of reactor 104.

Reactor 104 may be configured to operate at an average power in a range between about 10 kilowatts (kW) and about 30,000 kilowatts (kW). Reactor 104 may have peak power in a range between about three to four times the average power (e.g., about 10,000 kW to about 50,000 kW). Instantaneous pressures and/or temperatures may be greater than the average temperature and/or pressure. In some implementations, the instantaneous power may be directly proportional to the square of the pressure. By way of a non-limiting example, a small increase in pressure may cause a dramatic increase in the power being imparted to a given particle and/or species. Responsive to increasing the peak power, peak temperatures and/or pressures may be much greater than the average pressure and/or temperature.

In some implementations, one or more components of reactor 104 may generate constructive and/or destructive interference of waves including a first wave. One or more inlet nozzles may be configured to generate a pure tone and/or a fixed frequency wave including a second wave. The harmonics of the second wave may constructively and/or destructively interfere with the first wave in some implementations, causing very large increases in peak pressure. The increases in peak pressure may be in a range between about 30 megapascals (MPa) and about 90 megapascals (MPa). Reactor 104 may be configured for peak pressure variations and/or very large fluctuations.

In some implementations, chamber 200 may be designed to facilitate an acoustic feedback system. In some implementations, chamber 200 of reactor 104 may be designed as an open-ended system. In some implementations, one or more inlet nozzles may be tuned by a Hartman oscillator. In some implementations, one or more inlet nozzles and/or chamber 200 may be considered as one acoustic device for a given set of conditions desired in system 100. In some implementations, a Hartman type nozzle may be designed such that chamber 200 may not resonate with one or more inlet nozzles. In some implementations, the material and/or species within chamber 200 may effectively absorb energy generated by one or more inlet nozzles. Particles and/or species within chamber 200 may absorb the energy.

In some implementations, tuning the frequency, the dimensions, and/or the configurations of one or more inlet nozzles and/or chamber 200 may amplify the pressure and/or temperature oscillations and/or variations within chamber 200. In some implementations, gas under pressure may be heated above critical temperature and/or pressure before it may be allowed to expand. Inversion temperature includes the critical temperature below which a gas expanding at constant enthalpy may experience temperature decrease, and above which may experience temperature increase. By way of non-limiting example, compressed air heated above 325 degrees Celsius may expand as the temperature of the compressed air increases. Compressed air below 325 degrees Celsius may expand as the temperature of the compressed air decreases. Responsive to gas expanding in relatively low temperature conditions, conventional Joule-Thomson cooling may occur across the expansion nozzle. Responsive to temperature of a working gas being above critical temperature prior to expansion, the temperature may increase upon expansion.

In some implementations, one or more inlet nozzles may be configured such that fluctuations in temperature and/or pressure occur across Hartmann type nozzle(s). By way of non-limiting example, as gas is emitted by one or more inlet nozzles, the temperature fluctuations may be greatly amplified. In some implementations, one or more inlet nozzles may be tuned to produce extreme fluctuation in temperature and/or pressure (e.g., reverse Joule-Thomson effect). By way of non-limiting example, responsive to such pressure variations and/or temperature variations across one or more inlet nozzles, the temperature of the first wave generated by one or more inlet nozzles may be decreasing due to conventional Joule-Thomson cooling, and the temperature of the second wave may rise dramatically wherein the pressure exceeds the inversion temperature and/or pressure. In some implementations, reverse Joule-Thomson heating effect may be coupled with conventional Joule-Thomson cooling and applied to comminution and/or chemical reactions.

Figure 7:
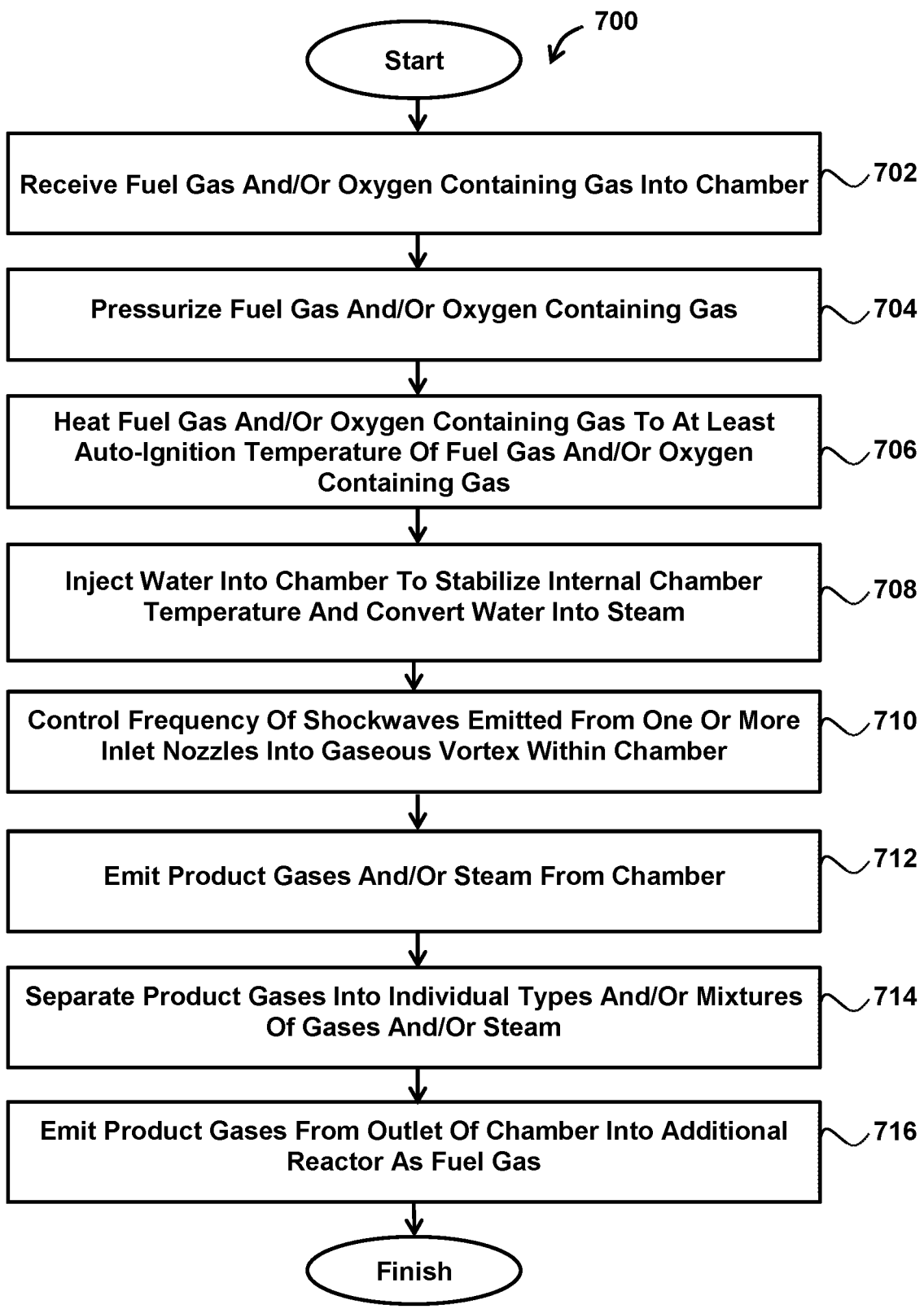
FIG. 7 illustrates a method for generating steam using an apparatus that creates shockwaves in a supersonic gaseous vortex, in accordance with one or more implementations.

FIG. 7 illustrates a method 700 for generating steam using an apparatus or reactor that creates shockwaves in a supersonic gaseous vortex, in accordance with one or more implementations. The operations of method 700 presented below are intended to be illustrative. In some implementations, method 700 may be accomplished with one or more additional operations not described, and/or without one or more of the operations discussed. Additionally, the order in which the operations of method 700 are illustrated in FIG. 7 and described below is not intended to be limiting.

At an operation 702, receive fuel gas and/or oxygen containing gas into a chamber. Operation 702 may be facilitated by components that are the same as or similar to those associated with chamber 200 (as described in connection with FIG. 1), in accordance with one or more embodiments.

At an operation 704, pressurize the fuel gas and/or the oxygen containing gas. Operation 704 may be facilitated by components that are the same as or similar to those associated with chamber 200 (as described in connection with FIGS. 2A and 2B), in accordance with one or more embodiments.

At an operation 706, heat the fuel gas and/or the oxygen containing gas to at least auto-ignition temperature of the fuel gas and/or the oxygen containing gas. Operation 706 may be facilitated by components that are the same as or similar to those associated with chamber 200 (as described in connection with FIGS. 2A and 2B), in accordance with one or more embodiments. By way of non-limiting example, the temperature of the fuel gas and/or the oxygen containing gas may breach auto ignition temperature.

At an operation 708, inject water into the chamber to stabilize internal chamber temperature and/or convert the water into steam. Operation 708 may be facilitated by components that are the same as or similar to the one or more inlets (as described in connection with FIGS. 2A and 2B), in accordance with one or more embodiments. By way of non-limiting example, responsive to the internal chamber temperature breaching the auto ignition temperature, water may be injected into the chamber. Water may be injected into the chamber by the one or more inlets and/or by one or more inlet nozzles.

At an operation 710, control frequency of shockwaves emitted from the one or more inlet nozzles into a gaseous vortex within the chamber. Operation 710 may be facilitated by components that are the same as or similar to the one or more inlet nozzles (as described in connection with FIG. 6), in accordance with one or more embodiments.

At an operation 712, emit product gases and/or steam from the chamber. Operation 712 may be facilitated by components that are the same as or similar to outlet 152 (as described in connection with FIG. 1), in accordance with one or more embodiments.

At an operation 714, separate product gases into individual types and/or mixtures of gases and/or steam. Operation 714 may be facilitated by components that are the same as or similar to product gas separator 112 (as described in connection with FIG. 1), in accordance with one or more embodiments.

At an operation 716, emit product gases from the outlet of the chamber into an additional reactor as fuel gas. Operation 716 may be facilitated by components that are the same as or similar to outlet 152 and/or additional reactor 304 (as described in connection with FIGS. 1 and 3, respectively), in accordance with one or more embodiments.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for generating steam using an apparatus that creates shockwaves in a supersonic gaseous vortex, the system comprising:
   an apparatus configured to generate steam and combine the steam with heat from combustion, the apparatus including:
      a chamber having an internal surface and a longitudinal axis, the chamber being configured to (1) receive at least fuel gas and/or oxygen containing gas, (2) pressurize the at least fuel gas and/or the oxygen containing gas, and (3) heat the at least fuel gas and/or the oxygen containing gas to a temperature exceeding an auto-ignition temperature of the fuel gas and/or the oxygen containing gas to generate product gases;
      at least two inlets positioned at a first end of the chamber, at least one inlet arranged to introduce one or more of the fuel gas and/or the oxygen containing gas, and at least a second inlet arranged to introduce water, the at least two inlets arranged to introduce at least two or more jet streams tangentially to the internal surface of the chamber to create a gaseous vortex rotating about the longitudinal axis within the chamber, the two or more inlets each comprising one or more inlet nozzles configured to accelerate the one or more jet streams to a supersonic velocity, the one or more inlet nozzles being structured to adjustably control a frequency of shockwaves generated from the one or more inlet nozzles into the gaseous vortex, wherein the at least second inlet is configured to inject water into the chamber in response to the fuel gas and/or the oxygen containing gas exceeding the auto ignition temperature of the fuel gas and/or the oxygen containing gas, thereby stabilizing the internal chamber temperature by converting the water into steam; and
      an outlet positioned proximal to the longitudinal axis at a second end of the chamber opposite from the first end, the outlet being configured to emit one or both of the product gases or the steam from the chamber.

2. The system of claim 1, wherein the at least two or more inlets comprise at least a first inlet, a second inlet, and a third inlet, the first inlet being configured to introduce the fuel gas, the second inlet being configured to introduce the water, the third inlet being configured to introduce the oxygen containing gas.

3. The system of claim 2, wherein the first inlet, the second inlet, and the third inlet are positioned about the first end of the chamber and arranged such that a first jet emitted by the first inlet impinges on a first replaceable wear part, a second jet emitted by the second inlet impinges on a second replaceable wear part, and a third jet emitted by the third inlet impinges on a third replaceable wear part.

4. The system of claim 1, wherein the at least two or more inlets comprise at least a first inlet positioned at a first end of the chamber and arranged to introduce the fuel gas and/or the oxygen containing gas as a first jet tangentially to the internal surface of the chamber to create a gaseous vortex rotating about the longitudinal axis within the chamber, the at least first inlet comprising a first inlet nozzle configured to accelerate the first jet to a supersonic velocity, the first inlet nozzle being structured to adjustably control the frequency of shockwaves emitted from the first inlet nozzle into the gaseous vortex.

5. The system of claim 1, wherein the at least second inlet is positioned at a first end of the chamber and arranged to introduce the water as a second jet tangentially to the internal surface of the chamber to create a gaseous vortex rotating about the longitudinal axis within the chamber, the at least second inlet comprising a second inlet nozzle configured to accelerate the second jet to a supersonic velocity, the second inlet nozzle being structured to adjustably control a frequency of shockwaves emitted from the second inlet nozzle into the gaseous vortex.

6. The system of claim 2, wherein the third inlet is positioned at a first end of the chamber and arranged to introduce the the oxygen containing gas as a third jet substantially tangentially to the internal surface of the chamber to create a gaseous vortex rotating about the longitudinal axis within the chamber, the third inlet comprising a third inlet nozzle configured to accelerate the third jet to a supersonic velocity, the third inlet nozzle being structured to adjustably control a frequency of shockwaves emitted from the third inlet nozzle into the gaseous vortex.

7. The system of claim 1, wherein the apparatus further comprises a first replaceable wear part configured to protect the internal surface of the chamber, the first replaceable wear part being positioned within the chamber such that the at least two lets impinge on the first replaceable wear part instead of impinging on the internal surface of the chamber.

8. The system of claim 1, further comprising a product gas separator configured to receive the product gases and separate the product gases into individual types or mixtures of gases.

9. The system of claim 8, wherein the product gas separator is facilitated by pressure swing adsorption (PSA).

10. The system of claim 1, wherein the apparatus is configured to generate temperatures in a range between about 80 degrees Celsius and about 1200 degrees Celsius.

11. The system of claim 1, wherein the apparatus is configured to generate pressures in a range between about 0.1 megapascals (MPa) and about 30 megapascals (MPa).

12. The system of claim 1, wherein the apparatus is configured to be coupled to an additional apparatus such that the product gases emitted from the outlet of the chamber are emitted into the additional apparatus as the fuel gas.

13. The system of claim 1, wherein the product gases comprise one or more gases selected from the group consisting of superheated steam, pure steam, very clean steam, hydrogen, carbon dioxide, carbon monoxide, and mixtures thereof.

14. The system of claim 1, wherein the fuel gas comprises one or more gas selected from the group consisting of hydrogen, coal, natural gas, synthetic gas, oxygen, air, carbonaceous fuel, carbon dioxide, carbon monoxide, carbonaceous solid, carbonaceous liquid, clean hydrogen, Municipal Solid Waste (MSW), methane, hydrocarbon gas, hydrocarbon liquid, hydrocarbon solid, and mixtures thereof.

15. The system of claim 1, wherein water injected into the chamber is heated prior to being injected into the chamber.

16. A method for generating steam using an apparatus that creates shockwaves in a supersonic gaseous vortex, the method comprising:
generating steam in an apparatus, the apparatus comprising a chamber having an internal surface and a longitudinal axis;
the chamber being configured to:
receive at least one or more of a fuel gas or an oxygen containing gas, and at least water as at least two or more jet streams tangentially to the internal surface of the chamber to create a gaseous vortex rotating about the longitudinal axis within the chamber, the at least two or more jet streams being received via at least two or more inlets positioned at a first end of the chamber, the at least two or more inlets each comprising one or more inlet nozzles configured to accelerate the one or more jet streams to a supersonic velocity, the at least two or more inlet nozzles being structured to adjustably control a frequency of shockwaves generated from the one or more inlet nozzles into the gaseous vortex;
pressurizing the fuel gas and/or the oxygen containing gas;
heating the fuel gas and/or the oxygen containing gas to a temperature exceeding an auto-ignition temperature of the fuel gas and/or the oxygen containing gas to thereby combust the gas and generate heat from combustion and product gases;
receiving water from the one or more inlets to stabilize the internal chamber temperature;
converting the water into steam;
combining the steam with the heat from combustion; and
emitting one or both of product gases or the steam from the chamber via an outlet positioned proximal to the longitudinal axis at a second end of the chamber opposite from the first end.

17. The method of claim 16, further comprising separating the product gases into individual types or mixtures of gases.

18. The method of claim 16, further comprising emitting the product gases from the outlet of the chamber into an additional apparatus as a fuel gas.

* * * * *